2,962,459
Patented Nov. 29, 1960

2,962,459

COMPOSITION COMPRISING PHENOLIC RESIN AND CELLULOSIC MATERIAL COATED WITH PETROLEUM HYDROCARBON AND PROCESS FOR PREPARING BOARD THEREFROM

Jacob R. Ash, Bellevue, Gordon E. Brown, Seattle, and Charlton R. Cox, Bellevue, Wash., assignors to Monsanto Chemical Company, St. Louis, Mo., a corporation of Delaware No Drawing. Filed July 1, 1958, Ser. No. 745,805

7 Claims. (Cl. 260—17.2)

This invention relates to consolidated structural units fabricated from particulate cellulosic waste materials. More particularly, the invention relates to structural hardboard and chipboard made from comminuted wood, or other cellulosic waste, bonded with a phenolic resin.

Hardboard is a generic term used to describe boards, panels, etc., made by compressing a mixture of comminuted wood such as fiber chips, or other wood wastes, with a thermosetting binder under sufficient heat to set the binder. For best results, it has been found necessary to use a relatively high molecular weight resin for admixture with the wood waste in order to get optimum properties. The best of these high molecular weight resins are prepared by using relatively large amounts of caustic in the preparation of the phenolic resin employing a stepwise procedure for the caustic addition. Such resins produce hardboard of high strength properties but unfortunately have the disadvantage of discoloring the wood and increasing the water sensitivity of the final product.

One object of this invention is to produce structural panels from particulate cellulosic waste materials.

Another object of this invention is to produce undiscolored hardboard and chipboard having high strength properties coupled with low moisture absorption.

A further object of this invention is to provide a particulate combination of wood waste and phenolic resin, which when formed into chipboard and hardboard, will have high strength properties, low moisture absorption properties and good color.

These and other objects are attained by preparing a relatively high molecular weight thermosettable phenolformaldehyde resin using relatively low amounts of alkali and a special heat treatment with alcohols and subsequently employing said resin as a binder for wax-treated fibers derived from particulate cellulosic waste materials.

The following examples are given in illustration of this invention and are not intended as limitations thereof. Where parts are mentioned they are parts by weight.

Example I

Prepare a phenolic resin in the following manner: Mix 100 parts of phenol with 160 parts of formalin (37% formaldehyde), 50 parts of methanol and 16 parts of a 50% aqueous solution of sodium hydroxide. Heat the mixture at reflux temperature and atmospheric pressure until the viscosity of the reaction mixture at 21° C. is about 40–45 on a MacMichael 26d wire. The product is a solution of a fusible thermosettable methanol modified phenolformaldehyde condensation product in a mixture of water and methanol.

Example II

Prepare a phenolic resin as in Example I but omit the methanol until the viscosity of the reaction mixture at 21° C. is about 100–120 on a MacMichael 26d wire. Then add the 50 parts of methanol and continue the condensation reaction until the viscosity of the reaction mixture at 21° C. is re-raised to about 40–45 on a MacMichael 26d wire. The methanol modified phenolformaldehyde condensation product obtained is similar to that of Example I in apperance.

The following examples, IIIa–c, are included for comparative purposes only. These examples show, respectively, a methanol modified phenolic resin containing only 30% of the quantity of methanol as the resin of Example I, a phenolic resin wherein the methanol is present merely as a solvent and a phenolic resin containing no methanol at all.

Example IIIa

Prepare a phenolic resin as in Example I but increase the amount of the 50% aqueous solution of sodium hydroxide to 30 parts and decrease the amount of methanol to 15 parts. The methanol modified phenol-formaldehyde condensation product obtained is similar to that of Example I in appearance.

Example IIIb

Prepare a phenolic resin as in Example I but increase the amount of the 50% aqueous solution of solution hydroxide to 40 parts and eliminate the methanol entirely during the condensation reaction. Carry the condensation to a viscosity sufficiently high such that the addition of 50 parts of methanol will adjust the resin viscosity at 21° C. to about 40–45 on a MacMichael 26d wire. The product is a solution of a fusible thermosettable phenol-formaldehyde condensation product in a mixture of water and methanol.

Example IIIc

Prepare a phenolic resin as in Example I but omit the methanol entirely. The product is a solution of a fusible thermosettable phenol-formaldehyde condensation product in water.

In the following Example IV, each phenolic resin prepared is evaluated as a binder for wax-treated wood chips.

Example IV

Prepare chipboard by spraying the resins of Examples I, II and IIIa–c on separate masses of wood chips which have been previously mixed with about 1.5% by weight of petrolatum, based upon the dry weight of the wood chips, using sufficient resin to apply about 5% of solid resin by weight based on the weight of the wood chips. Place the resin-wax-wood chip mix in a mold and press while cold to effect partial densification and then press at 350° F. at pressures of 150–250 p.s.i. for approximately 12 minutes to make boards measuring $13/16$ inches in thickness. On removal from the die, it will be found that dense, smooth-surfaced boards are produced from each of the resins used. However, the boards made from the resins of Examples IIIa–c are considerably darker in color than those made from Examples I and II.

The boards made by the process described in Example IV are tested for modulus of rupture (M.O.R.), percent water absorption and percent swelling. The results obtained are set forth in the following table:

| Resin Of Example | M.O.R. (p.s.i.) | Water Absorption Percent | Swelling Percent |
|---|---|---|---|
| I | 1,860 | 18.0 | 3.2 |
| II | 1,820 | 18.2 | 3.3 |
| IIIa | 1,660 | 40.6 | 11.1 |
| IIIb | 1,620 | 80.0 | 16.0 |
| IIIc | 1,200 | 21.0 | 4.0 |

It is apparent from this table that the alcohol modified phenol-formaldehyde resins of this invention, as represented by the methanol modified resins of Examples I and II, provide hardboard having superior modulus of rupture combined with low water absorptivity and relatively little swelling tendencies. The use of less modifying alcohol necessitates the use of more sodium hydroxide to make serviceable bonding resins (see Example IIIa) which causes increased water absorptivity and swelling tendencies in hardboard produced therefrom. Resins containing no modifying alcohol (see Example IIIb which contains methanol only as a solvent) require the use of even more sodium hydroxide and produce hardboard having very poor water absorptivity and swelling tendencies. Attempts to eliminate the alcohol without increasing the sodium hydroxide yield resins which produce hardboard of markedly inferior strength (see Example IIIc).

Modulus of rupture tests and water absorption and percent swelling tests are performed according to the following procedures:

(1) *Modulus of rupture.*—A 2-inch wide specimen is broken on a 6-inch span (depends on the thickness of the board tested):

a. Determine the density of specimen.
b. Center the specimen on the span and apply force at the rate of 0.5–4" per minute until rupture occurs.
c. Calculation:

$$M.O.R. = \frac{3SBl}{2Wt^3}$$

where:

M.O.R.=modulus of rupture
S=span in inches
Bl=breaking load in pounds
W=width in inches
t=thickness in inches (2) *Dimensional stability.*—A 7" x 9" specimen is immersed in 70° F. tap water for 24 hours:

a. Weigh the specimen, measure its thickness at two points near the center of the panel and immerse it for 24 hours.
b. The immersed specimens are removed and blotted to remove excess water, weighed and measure.
c. Report the increase in weight and thickness divided by original weight and thickness respectively as percent water absorption and percent swelling.

The following examples, V–IX, illustrate other methanol modified phenolic resins of this invention as well as various methods for the fabrication of chipboard and hardboard using such resins as binders.

*Example V*

Prepare a phenolic resin by mixing 100 parts of phenol with 160 parts of formalin (37% formaldehyde), 25 parts of methanol, and 16 parts of a 50% aqueous solution of sodium hydroxide. Heat the mixture at reflux temperature and atmospheric pressure until the viscosity of the reaction mixture at 21° C. is about 40–45 on a MacMichael 26d wire. The product is a solution of a fusible, thermosettable methanol modified phenol-formaldehyde condensation product in a mixture of water and methanol.

*Example VI*

Slurry 100 parts of discrete wood fibers, pre-mixed with about 1.5% of petrolatum by weight, in an excess of water and add thereto an amount of the resin solution of Example V sufficient to provide ¾% by weight of resin solids, the percentage of wax and of resin being based on the dry weight of the fibers. After thoroughly mixing the resin solution with the aqueous slurry of the fibers, add sufficient aluminum sulfate and sulfuric acid to the slurry to adjust the pH of the slurry to about 4.1 and continue the mixing operation for a short time. As a result of these operations, the resin is precipitated from the aqueous medium of the solution onto the fibers. Next, drain excess water from the fibers by pouring the slurry onto a fine mesh screen. The wet fibers will contain from 70–130% by weight of water. Place a portion of the wet fibers in a mold and apply pressure in the absence of increased temperature to further squeeze out excess water. Place the preformed mat thus prepared into a mold, one board surface of which is made of a fine mesh screen. Press the mat in the mold at about 380° F. under an initial pressure of about 750 p.s.i. for about 1 minute, releasing the pressure to about 50 p.s.i. for the next 3 minutes to allow the escape of volatiles and finally increasing the pressure to about 600 p.s.i. for 5 minutes. The product is a hardboard having one smooth surface and one surface carrying the imprint of the screen. A ⅛" board made in this manner has a M.O.R. of approximately 4700 p.s.i. and a water absorption of less than 20%.

*Example VII*

Prepare a methanol modified phenolic resin as in Example VI except use 75 parts of methanol and then prepare a hardboard by the wet process shown in Example VI. A ⅛" board thus prepared has a M.O.R. of nearly 6000 p.s.i. and a water absorption of less than 20%.

*Example VIII*

Prepare a hardboard by the "damp process" using the resin solution of Example V. In the damp process, wood waste comprised of discrete wood fibers, treated with about 1.5% of paraffin wax by weight based upon the dry weight of the fibers is analyzed for moisture content. The resin to be added is then diluted and the dilute solution is sprayed onto the fibers so that the moistened fibers will contain from 30–50% water. The amount of resin applied to the fibers will constitute about 2½% by weight based on the dry weight of the fibers. In the damp process the hardboard is consolidated under heat and pressure using a mold having one board surface in the form of a fine mesh screen, in the same manner as in the wet process. The resin-wood chip mixture is pressed into a ⅛" board at 320° F. using an initial pressure of about 750 p.s.i. for 1 minute, then releasing the pressure to atmospheric pressure for about ¾ of a minute to allow the escape of volatiles and finally increasing the pressure to about 150 p.s.i. for 5¼ minutes. The hardboard produced has a M.O.R. of approximately 6800 p.s.i. and less than 20% moisture absorption.

A similar board made by the damp process using the resin of Example VII has a M.O.R. of about 7200 p.s.i. with no substantial increase in moisture absorption.

*Example IX*

Prepare an alcohol modified phenolic resin by mixing together 100 parts of phenol with 160 parts of formalin (37% formaldehyde), 2 parts of methanol, 20 parts of isopropanol, and 16 parts of a 50% aqueous solution of sodium hydroxide. Heat the mixture at reflux temperature and atmospheric pressure until the viscosity of the reaction mixture at 21° C. is about 40–45 on a MacMichael 26d wire. The product is a solution of a fusible, thermosettable methanol and isopropanol modified phenol-formaldehyde condensation product in a mixture of water, methanol, and isopropanol. A ⅛" board made from this solution by the damp process of Example XIII using 2½% resin solids by weight based on the weight of the fibers has a M.O.R. of approximately 7000 p.s.i.

The resins to be used in preparing the hardboard of this invention are condensation products of a phenol with formaldehyde using an alkaline catalyst plus a heat treatment with an alcohol. Phenol itself is the preferred phenolic reactant but it may be replaced in whole or in part by cresols or xylenols or mixtures thereof. The formaldehyde may be used in the form of the aqueous solution known as formalin or in any of its solid polymeric forms. The amount of formaldehyde should be restricted to 1.6–2.7 mols per mol of phenol.

The alkaline catalyst should be an alkali metal hydroxide such as lithium, sodium, potassium, rubidium, or cesium hydroxide and should be used in an amount ranging from 0.1–0.2 mol per mol of phenol. The catalyst should be added to the reaction mixture as an aqueous solution thereof.

It is essential that the condensation product be reacted for an extended period of time in the presence of an aliphatic alcohol containing from 1–4 carbon atoms, such as methanol, ethanol, propanol, isopropanol, and the various butanols. The heat treatment is best carried out and more uniform results are obtained by adding the alcohol to the reaction mixture before any condensation has taken place. However, it is possible to prepare a preliminary condensation product before adding the alcohol provided an extended period of heating is used after addition of the alcohol. The amount of alcohol employed should be at least 0.5 and not more than 3 mols of alcohol per mol of phenol. The end point of the heat treatment with the alcohol is best determined by viscosity measurements taken at intervals during the reaction period. This viscosity taken in a MacMichael viscometer on a 26d wire should range at a temperature of 21° C. from 30–65 MacMichael units.

When prepared according to the above examples, the resin is obtained in the form of a solution of a condensation product in water and alcohol and this solution may be used directly for the preparation of consolidated panels, etc. of particulate cellulosic waste materials.

Hardboard is made from comminuted wax-treated wood waste which is generally in the form of discrete fibers. The hardboard may be made by a dry, damp, or wet process. The dry process is essentially the same as that used for making chipboard. In the damp process, a larger amount of water is desired; i.e., from 30–50% water. Generally, the amount of moisture in the fibers is determined and the resin solution is then diluted to make up the desired amount. The resin solution may then be sprayed on the fibers or mixed with the fibers in a conventional mixing apparatus. In the wet process, the wet fibers are slurried in a large amount of water. The resin solution is added to the slurry and then sufficient alum or other precipitating agent such as sulfuric acid is added to the slurry to adjust the pH thereof to 3.0–5.0 and to precipitate the resin on the fibers.

Particulate cellulosic fibrous waste from sources other than wood may be used in the practice of this invention. Bagasse, crushed corn cobs, etc. may be similarly employed with equivalent results.

The wax-treated particulate cellulosic waste, whether it be wood chips, discrete wood fibers, bagasse, etc., may be prepared according to conventional techniques, e.g., spraying molten or emulsified wax onto the cellulosic waste in a ribbon blender, etc. From about 0.5–2.5% by weight of wax, based upon the dry weight of the cellulosic waste, is employed. In making chipboard, from about 0.5–1.5% by weight of wax is used. Hardboard is generally made using from about 1.0–2.5% by weight of wax. Conventional hydrocarbon mineral waxes, e.g., paraffin wax, petrolatum, etc. are employed.

By each of the above processes, a bulky material is obtained which must be prepressed in the cold to reduce the bulk value of the treated fibers and obtain a practical preform for the final molding step. In the case of the fibers treated by the damp or wet process, excess moisture must be removed during the prepressing and in the final pressing steps. To accomplish this one broad face of the prepressing mold and also of the final press mold is in the form of a fine mesh screen. The amount of resin used in the damp process will vary from 1–5% by weight based on the fibers and the amount of resin used in the wet process will vary from ½–2% by weight. Chipboard is prepared using from 2–20% by weight of resin based upon the wood chips.

The prepressed article is then pressed into final form under heat and pressure. The temperature of the pressing operation may vary between 250–400° F. and the pressure of the hot pressing operation may vary between 100–1000 p.s.i. When making hardboard according to the wet or damp processes, an initial high pressure, i.e., above about 500 p.s.i. should be applied, followed by a brief decrease in pressure to from atmospheric pressure to about 50 p.s.i. to allow the escape of volatiles; finally completing the pressing at a higher pressure, i.e., above 150 p.s.i.

Various conventional additives such as wax emulsions, coloring pigments or dyes, mold lubricants, etc., may be incorporated in the resin and particulate cellulosic waste compositions before the pressing operation.

This invention is a continuation-in-part of application S.N. 581,327, filed April 30, 1956.

It is obvious that many variations may be made in the products and processes of this invention without departing from the spirit and scope thereof.

What is claimed is:

1. A process for preparing a consolidated particulate cellulosic waste product which comprises adding a phenolic resin to wax-treated particulate cellulosic waste, prepressing the mass so obtained to prepare a preform, and heating the preform at 250–400° F. under a pressure of 100–1000 p.s.i.; said phenolic resin being prepared by condensing 1 mol of phenol with from 1.6–2.7 mols of formaldehyde and 0.5–3 mols of an alcohol taken from the group consisting of monohydric aliphatic alcohols containing from 1–4 carbon atoms and mixtures thereof, the condensation reaction having been carried out in an aqueous medium in the presence of from 0.1–0.2 mol of an alkali metal hydroxide at 180–220° F. until a 21° C. MacMichael 26d viscosity of 30–65 is attained; said wax-treated particulate cellulosic waste having been prepared by pre-mixing the particulate cellulosic waste with from 0.5–2.5% by weight, based upon the dry weight of the waste, of a petroleum mineral hydrocarbon of the group consisting of petrolatum and paraffin waxes.

2. A process for preparing a chipboard which comprises adding from 2–20 parts of a phenolic resin to 100 parts of comminuted wood in the form of wax-treated wood chips, prepressing the mass so obtained to prepare a preform, and heating the preform at 250–400° F. under a pressure of 100–1000 p.s.i.; said phenolic resin being prepared by condensing 1 mol of phenol with from 1.6–2.7 mols of formaldehyde and 0.5–3 mols of an alcohol taken from the group consisting of monohydric aliphatic alcohols containing from 1–4 carbon atoms and mixtures thereof, the condensation reaction having been carried out in an aqueous medium in the presence of from 0.1–0.2 mol of an alkali metal hydroxide at 180–220° F. until a 21° C. MacMichael 26d viscosity of 30–65 is attained; said wax-treated wood chips having been prepared by pre-mixing the wood chips with from 0.5–1.5% by weight, based upon the dry weight of the wood chips, of a petroleum mineral hydrocarbon of the group consisting of petrolatum and paraffin waxes.

3. A consolidated particulate cellulosic waste product which comprises particulate cellulosic waste coated with from 0.5–2.5% by weight, based upon the dry weight of the waste, of a petroleum mineral hydrocarbon of the group consisting of petrolatum and paraffin waxes and bonded with a thermoset phenol-formaldehyde resin; said thermoset phenol-formaldehyde resin having been prepared by condensing 1 mol of phenol with from 1.6–2.7 mols of formaldehyde and from 0.5–3 mols of an alcohol taken from the group consisting of monohydric aliphatic alcohols containing from 1–4 carbon atoms and mixtures thereof, the condensation reaction having been carried out in an aqueous medium in the presence of from 0.1–0.2 mol of an alkali metal hydroxide at 180–220° F. until a 21° C. MacMichael 26d viscosity of 30–65 is attained.

4. A product as in claim 3 wherein the alcohol is methanol.

5. A product as in claim 3 wherein the alcohol is a mixture of methanol and isopropanol.

6. A chipboard comprising wood chips coated with from 0.5–1.5% by weight, based upon the dry weight of the wood chips, of a petroleum mineral hydrocarbon of the group consisting of petrolatum and paraffin waxes and bonded with from 2–20% by weight, based upon the dry weight of the wood chips, of a thermoset phenol-formaldehyde resin; said thermoset phenol-formaldehyde resin having been prepared by condensing 1 mol of phenol with from 1.6–2.7 mols of formaldehyde and from 0.5–3 mols of an alcohol taken from the group consisting of monohydric aliphatic alcohols containing from 1–4 carbon atoms and mixtures thereof, the condensation reaction having been carried out in an aqueous medium in the presence of from 0.1–0.2 mol of an alkali metal hydroxide at 180–220° F. until a 21° C. MacMichael 26d viscosity of 30–65 is attained.

7. A hardboard comprising wood fibers coated with from 1.0–2.5% by weight, based upon the dry weight of the wood fibers, of a petroleum mineral hydrocarbon of the group consisting of petrolatum and paraffin waxes and bonded with from 0.5–5% by weight, based upon the dry weight of the wood fibers, of a thermoset phenol-formaldehyde resin; said thermoset phenol-formaldehyde resin having been prepared by condensing 1 mol of phenol with from 1.6–2.7 mols of formaldehyde and from 0.5–3 mols of an alcohol taken from the group consisting of monohydric aliphatic alcohols containing from 1–4 carbon atoms and mixtures thereof, the condensation reaction having been carried out in an aqueous medium in the presence of from 0.1–0.2 mol of an alkali metal hydroxide at 180–220° F. until a 21° C. MacMichael 26d viscosity of 30–65 is attained.

References Cited in the file of this patent

UNITED STATES PATENTS

| | | |
|---|---|---|
| 2,381,269 | Elmendorf et al. | Aug. 7, 1945 |
| 2,583,618 | Weyerhaenser | Jan. 29, 1952 |
| 2,736,718 | Webber | Feb. 28, 1956 |

UNITED STATES PATENT OFFICE
CERTIFICATION OF CORRECTION

Patent No. 2,962,459                        November 29, 1960

Jacob R. Ash et al.

It is hereby certified that error appears in the above numbered patent requiring correction and that the said Letters Patent should read as corrected below.

Column 2, line 23, for "solution", second occurrence, read -- sodium --; column 4, lines 7 and 38, for "board", each occurrence, read -- broad --.

Signed and sealed this 13th day of June 1961.

(SEAL)
Attest:

ERNEST W. SWIDER
Attesting Officer

DAVID L. LADD
Commissioner of Patents